United States Patent [19]

Jennings et al.

[11] Patent Number: 5,697,545
[45] Date of Patent: Dec. 16, 1997

[54] METHOD OF FRICTION WELDING

[75] Inventors: Howard Timothy Jennings; Roger Jeremy Wise, both of Warrington, United Kingdom

[73] Assignee: British Nuclear Fuels plc, Risley, England

[21] Appl. No.: 615,237

[22] PCT Filed: Jul. 14, 1995

[86] PCT No.: PCT/GB95/01665

§ 371 Date: Mar. 15, 1996

§ 102(e) Date: Mar. 15, 1996

[87] PCT Pub. No.: WO96/02350

PCT Pub. Date: Feb. 1, 1996

[30] Foreign Application Priority Data

Jul. 15, 1994 [GB] United Kingdom ............... 9414381

[51] Int. Cl.⁶ .................................................. B23K 20/12
[52] U.S. Cl. ...................... 228/112.1; 228/2.3; 156/580.2
[58] Field of Search ............................ 228/1.1, 2.3, 4.5, 228/110.1, 112.1, 114.5

[56] References Cited

U.S. PATENT DOCUMENTS

| 3,002,871 | 10/1961 | Tramm et al. | 228/2.1 |
| 3,184,841 | 5/1965 | Jones et al. | 228/1.1 |
| 3,581,969 | 6/1971 | Bodine | 228/1.1 |
| 3,863,826 | 2/1975 | Shoh | 228/1.1 |

OTHER PUBLICATIONS

Roger Wise, The Welding Institute Bulletin, "Ultrasonic welding—the next chapter", Jul./Aug. 1991.

*Primary Examiner*—Samuel M. Heinrich
*Attorney, Agent, or Firm*—Sheridan Ross P.C.

[57] ABSTRACT

A method of friction welding which comprises forcing together two components to be welded together and providing a relative oscillatory movement between the two components to cause rubbing together of the two components to provide friction welding thereof, said oscillatory movement being caused by means, acting on at least one of the said components, which comprises a magnetostrictive transducer.

20 Claims, 5 Drawing Sheets

METHOD OF FRICTION WELDING

FIELD OF THE INVENTION

This invention relates to a method of friction welding.

BACKGROUND OF THE INVENTION

Friction welding is a solid phase joining process which has been known for over 30 years. In friction welding, heat is generated by rubbing one component against another under pressure. Once enough heat has been generated, the rubbing action may be terminated and the pressure may be maintained or increased for a period of time to promote the solid phase bond. The most common form of friction welding uses rotating motion in which a component constantly rotating in a single rotational sense with its central axis in a fixed position is rubbed against another component which is stationary.

In another known form of friction welding, arcuate friction welding, arcuate reciprocating motion is produced relatively between two surfaces to be welded together. This known technique has been employed in the prior art for joining items requiring good angular alignment, e.g. vehicle thermostat housings and motor vehicle fuel tanks.

In another known form of friction welding, linear friction welding, one component is moved in a reciprocating fashion through a small linear displacement in the plane of the joint to be made. This method has been used mainly for welding plastics.

Yet another form of friction welding is orbital friction welding. This method is a combination of linear and rotational friction welding wherein the centre of one component relative to the other component is moved around a two dimensional curve, e.g. a circle, to provide the rubbing action.

SUMMARY OF THE INVENTION

According to the present invention there is provided a method of friction welding, the method comprising forcing together two components to be welded together and providing a relative oscillatory movement between the two components to cause rubbing together of the two components to provide friction welding thereof, said oscillatory movement being caused by means, acting on at least one of the said components, which comprises a magnetostrictive transducer.

The oscillatory friction welding may comprise linear, arcuate or orbital friction welding all of which are known per se as noted above and all of which involve at least a component of reciprocating motion of one component relative to the other.

The oscillations of the oscillatory movement may have a frequency greater than 5 kHz preferably approximately or greater than 10 kHz in contrast to the low frequency of rotational friction welding employed in the prior art.

The magnetostrictive transducer may advantageously comprise at least one piece, e.g. a rod, of magnetostrictive material together with means for applying an oscillating magnetic field across the piece whereby one dimension of the piece changes in an oscillatory manner, e.g. at a frequency of 5 kHz or more. The means for applying a magnetic field may advantageously apply a fixed magnetic field upon which is superimposed the oscillatory field whereby the said piece has a constant magnetisation component and oscillation takes place in an approximately linear part of the magnetisation curve.

The magnetostrictive material preferably comprises one or more rare earth metals and one or more metals selected from Fe, Ni, Co and Mn. The rare earth metal or metals preferably include terbium and the other metal may include iron. For example, the magnetostrictive material may comprise $Tb_p$ $Dy_q$ $Fe_r$ where p is in the inclusive range 0.25 to 3.0, q is in the inclusive range 0.65 to 0.75 and r is in the inclusive range 1.8 to 2.2. For example, the material may comprise $Tb_{0.27}$ $Dy_{0.73}$ $Fe_2$ which is commercially available under the Trade Mark Terfenol-D. The material may be incorporated in a binder, e.g. forming a metal matrix composite, as in Magmek 91 (Trade Mark) supplied by Feredyn Europe, Seminariegatan 30, S-752 28, Upsala, Sweden.

Where the friction welding is arcuate friction welding the transducer may cause angular movement of one end of at least one of the components in one angular direction. The oscillatory motion provided by the transducer may be transmitted to the member to be oscillated by one or more intermediate members.

The return angular movement may be provided by the transducer. This can be achieved because the equilibrium position of the transducer is at half the maximum extension possible, i.e. it has a displaced equilibrium position to take advantage of the linear part of the magnetisation cycle as explained hereinbefore. In the return movement of the cycle, the set magnetic field tends to zero and the transducer returns to its true equilibrium position. This relaxation provides the return angular movement. In other words, the transducer is capable of pushing and pulling provided that the mechanical linkage allows this to occur.

One of the components or both components may comprise a tubular member having one end to be friction welded to the other component. Preferably, in order to provide arcuate friction welding at least two transducers are provided.

In one example using two transducers, the transducers may be operated in out-of-phase relationship whereby the two components are both moved in opposite angular directions.

In another example using two transducers to provide arcuate friction welding, the transducers may be operated in phase directly or indirectly against reaction surfaces, e.g. projections or wings, on a clamping member clamped to one of the two components to be welded together, the reaction surfaces being angularly spaced 180 degrees apart with respect to the axis of oscillation whereby both transducers operate together to oscillate the clamping member and the component to be welded clamped by it.

Where the friction welding is linear friction welding, a magnetostrictive transducer may be used to cause reciprocation of one component. The other component may be stationary, or may itself be reciprocated in antiphase with the motion of the first component whereby the two components travel in opposite directions during the rubbing action. The reciprocating movement of the second component may be provided by a further magnetostrictive transducer. The position of the other end of each reciprocated component may be restored by a restoring means, e.g. spring, acting against the movement provided by the said magnetostrictive transducer (s). Alternatively, a further magnetostrictive transducer may act against the other end of the or each reciprocated component, i.e. so that magnetostrictive transducers act at both ends of the same component. In this case, the transducers at both ends act in antiphase whereby the transducer at one end is pushing by magnetostrictive expansion whilst the transducer at the other end is undergoing magnetostrictive contraction, and vice versa.

Where the friction welding is orbital friction welding, a first component to be welded to a second component may be moved in two dimensions across the surface of the second component (to provide rubbing) by at least two magnetostrictive transducers acting along axes at an angle, preferably at right angles, to one another in the plane of the surface of the first component. Reciprocation along one of the said axes may be provided by one of the said transducers and reciprocation along the other axis may be provided by the other of the said transducers. The two reciprocating movements may be 90° out-of-phase, whereby when one transducer is at its fully expanded or fully contracted position the other is at its neutral position (midway between fully expanded and fully contracted), and vice versa. The position of the component being moved may be restored along each reciprocation axis either by a passive restoring means, e.g. restoring spring, or by a further magnetostrictive transducer acting against the motion provided by the magnetostrictive transducer at the other side of the moved component on the same axis. In this case, the magnetostrictive transducers in each opposing pair preferably operate on the component in antiphase whereby one is expanding whilst the other is contracting. Thus, the arrangement may comprise four magnetostrictive transducers arranged at 90° intervals around the outside of the component to be moved, each transducer being 90° out-of-phase in its magnetostrictive expansion-contraction cycle with respect to its neighbouring two transducers. The component being moved preferably has a circular cross-section, e.g. it may be a tubular component, although it could have substantially flat sided outer surfaces, e.g. in a square cross-sectional configuration. The outer ends of the transducers may act against the inside surface of a fixed structure, e.g. a ring shaped cylinder or alternatively one having flat inner surfaces. The net effect is that the centre of the first component being moved describes a circular motion on the surface of the other (second) component.

The invention is particularly useful in relation to the welding together of two pipes. It may also be used to friction weld a tubular member to some other component. The component(s) to be welded need not be of elongate form, and might comprise a portion of a component, for example, a stub pipe portion to be welded to a vessel. It will be understood the components to be welded need not be of tubular form.

It is possible that other welding effects take place in use of the invention, for example fusion bonding together of the two components may occur.

The two surfaces to be friction welded together may be metal surfaces which may be the same or different metals. Alternatively, one surface may be of metal and the other may be of non-metallic, e.g. a ceramic or polymeric, material. One or both of the surfaces may comprise a composite material, e.g. a powder loaded or fibre reinforced composite, which may include a composite polymer matrix, a ceramic matrix or a metal matrix.

Where the invention is employed to provide linear friction welding, two sheets of material, e.g. metal, comprising the components may be welded together. An oscillating pad carried on a member, e.g. welding horn, oscillated by the magnetostrictive transducer, may be applied under pressure to rub and press the sheets together against a fixed plate.

The method of welding according to the present invention offers the following benefits. It offers the possibility of an all electric friction welding machine which may be very advantageous for some applications. High frequency welds in metals by the method can occur as a result of plasticising which allows the welding equipment to be more flexible in tackling certain applications and allows equipment to be used which is far less bulky that conventional equipment. The method allows friction welding to be carried out more quickly than in the prior art with corresponding savings in operational times and costs and increases in production rates.

Embodiments of the present invention will now be described by way of example with reference to the accompanying drawings.

DESCRIPTION OF THE INVENTION

Figure 1:
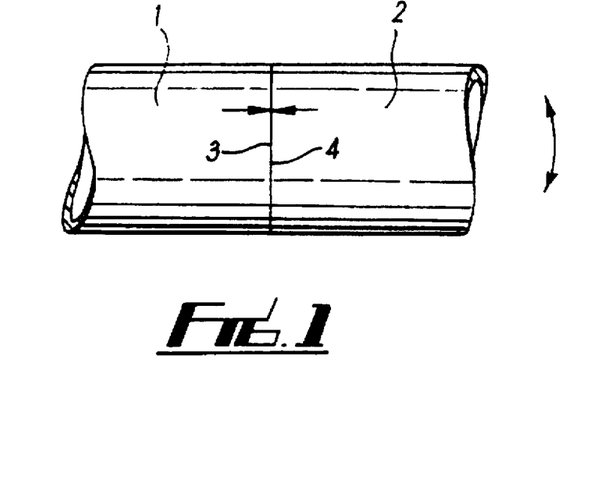
FIG. 1 is a side view of two tubular components whose respective ends are being mutually oscillated in an angular fashion to provide arcuate frictional welding.

Referring to FIG. 1, which illustrates the principle of one form of the invention, two tubular members in the form of pipes 1, 2 are shown having abutting ends 3, 4 respectively. The ends 3, 4 are forced together (e.g. by hydraulic or pneumatic means not shown) under a pressure and one of the pipes 1, 2 is angularly oscillated, i.e. reciprocated along an arcuate path, at a frequency of about 10 kHz. The arc described by the pipe 1 extends a few degrees relative to the other pipe 2. Movement is provided by a magnetostrictive transducer means (not shown) to cause arcuate frictional heating of the ends 3, 4 and thereby welding of the ends 3, 4 together.

Figure 2:
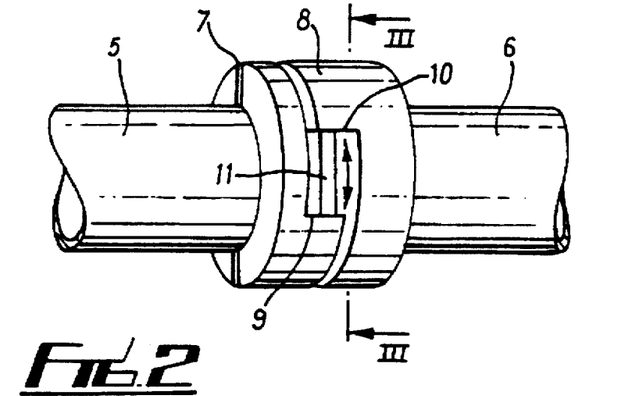
FIG. 2 is a perspective view of a more detailed arrangement for arcuate friction welding.
Figure 3:
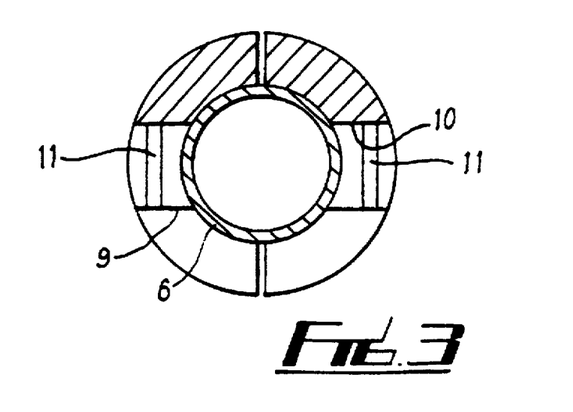
FIG. 3 is a part sectional end view on a plane containing the line III—III in FIG. 2.

Referring to FIGS. 2 and 3 pipes 5, 6 are shown in an alternative friction welding arrangement with respective split collars 7, 8 clamped thereto by screws (not shown). The collars 7, 8 are shaped to provide complementary stepped potions 9, 10, on each side of the collars 7, 8. Between each of complementary stepped portions 9, 10 a respective magnetostrictive transducer 11 extends. Hydraulic cylinders (not shown) acting on the collars 7, 8 bias the collars 7, 8 towards each other and, therefore, cause the ends (not shown) of the pipes 5, 6 to abut.

In operation of the arrangement shown in FIGS. 2 and 3 energisation of the transducers 26 by electromagnets (not shown) respectively supplied with alternating currents which are in 180° anti-phase relationship causes the transducers 11 to expand and contract in corresponding out-of-phase relationship, with the result that the collars 7, 8 and, therefore, the pipes 5, 6 are oscillated angularly a few degrees in opposition to each other at a frequency of about 10 kHz. Sufficient frictional heat is generated between the adjacent ends of the pipes 5, 6 as they rub together to effect welding thereof.

For some embodiments of the invention in arcuate friction welding arrangements, a plurality of transducers 11 may be used acting between respective stepped portions depending on the torque required to be transmitted to effect the oscillatory movement between the collars 7, 8. For other applications the use of a single transducer 11 might suffice, the inherent resilient flexibility of the pipes 5, 6 applying the restoring force on the angular oscillatory movement of the collars 7, 8.

Figure 4:
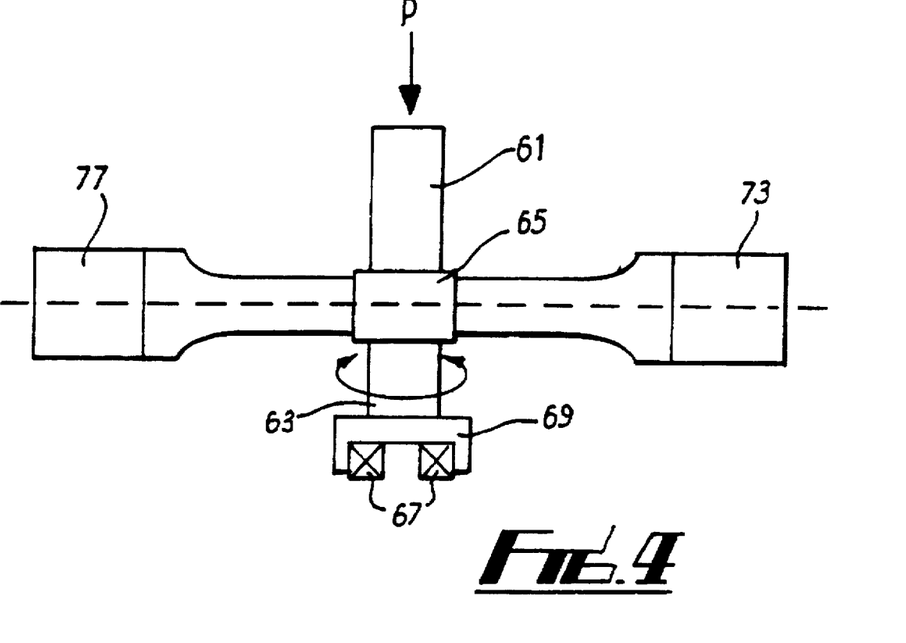
FIG. 4 is side view of an alternative arrangement for arcuate frictional welding.
Figure 5:
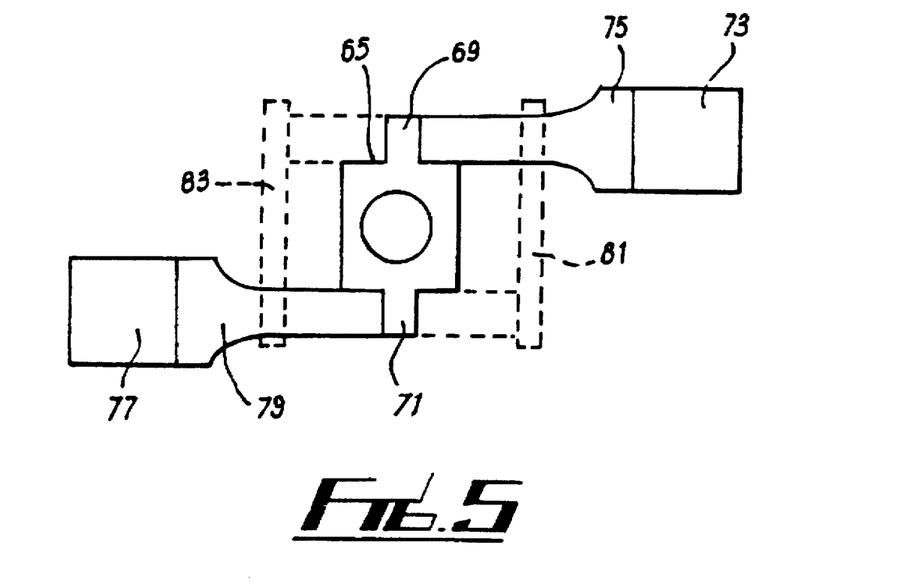
FIG. 5 is a sectional plan view on the line V—V shown in FIG. 4.

An alternative arrangement for arcuate friction welding is shown in FIGS. 4 and 5. A first tube 61 is being welded onto a second tube 63. The two tubes 61 and 63 are co-axial and are being welded at their respective ends. The tube 61 is held stationary by a fixed clamp (not shown). The tube 63 is gripped by a clamp 65 which is oscillated about the axis of the tube 63 causing corresponding reciprocating arcuate motion of the tube 63. The fixed tube 61 enters a cavity inside the clamp 65 and carries a support bush (not shown) made of polytetrafluoroethylene (PTFE) but the clamp 65 is free to oscillate around the bush. The tube 63 is supported through a bearing 67 by a member 69 near the end of the tube 63 distant from the tube 61.

The clamp 65 has projections or wings 69, 71 angularly spaced 180 degrees apart with respect to the axis of the tube 63. A magnetostrictive rod 73 acts upon the projection 69 through a power transmission member 75 and a magnetostrictive rod 77 acts in the opposite direction upon the projection 71 through a power transmission member 79. Optional power transmission members 81, 83 (shown by dashed lines in FIG. 4) may be included to transmit motion provided respectively by the rods 73, 77 to the projections 71, 69 at the sides thereof opposite the members 79, 75 respectively.

The lengths of each of the rods 73, 73 is varied in an oscillatory manner by an associated electromagnet (not shown) which supplies a magnetic field comprising a high frequency component superimposed upon a substantially constant component as described above. The lengths of the two rods 73, 73 are varied in phase by the magnetic fields applied to them so that the member 81 pushes on the projection 69 whilst the member 83 pushes on the projection 71.

In operation of the arrangement shown in FIGS. 4 and 5 the tube 63 is rubbed in an oscillatory manner at high frequency against the tube 61 whilst pressure is applied between the two tubes in the direction P. The pressure may be maintained after sufficient heat has been generated by friction and oscillation of the tube 63 is terminated.

Figure 6:
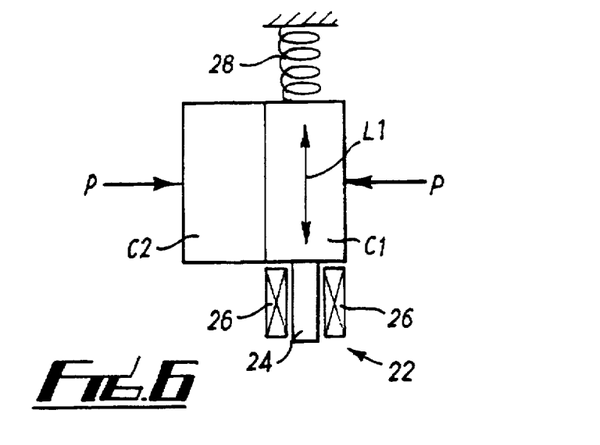
FIGS. 6, 7, and 8 are partly diagrammatic side views of alternative arrangements for linear friction welding.

FIG. 6 shows a simple arrangement for linear friction welding. A component C1 is to be joined to a component C2 in a plane perpendicular to the plane of the drawing. Reciprocating motion of the component C1 is provided along an axis indicated by the line L1 by a actuator 22 comprising a magnetostrictive rod 24 and an electromagnet 26. The length of the rod 24 is varied along the axis L1 by the magnetic field provided by the electromagnet 26. The magnetic field comprises a high frequency component superimposed upon a substantially constant component as described above. The rod 24 acts upon one end of the component C1. The other end of the component C1 is pushed by a restoring spring 28 toward the rod 24. Pressure is applied in a conventional way between the components C1 and C2 along an axis perpendicular to the plane of the joint as indicated diagrammatically by arrows P.

The component C2 is stationary. The pressure is applied whilst the component C1 is being rubbed against the component C2. When sufficient heat has been generated the rubbing action may be terminated but the pressure may be maintained or increased.

Figure 7:
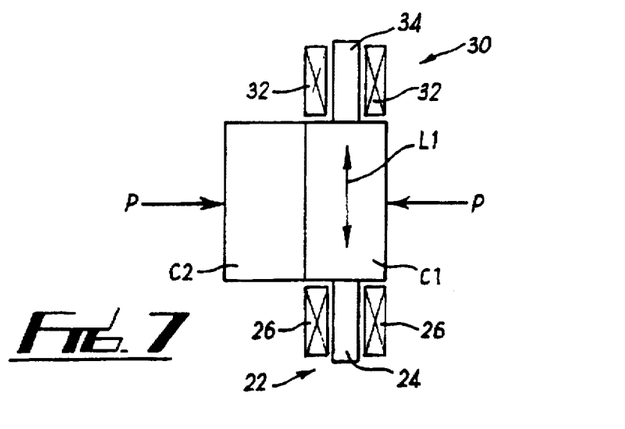

FIG. 7 shows an alternative arrangement for linear friction welding. In FIG. 7, the arrangement is similar in most respects to that shown in FIG. 6 (and like items are given like reference symbols) except that the spring 28 of FIG. 6 is replaced in FIG. 7 by an actuator 30 similar to the actuator 22 comprising an electromagnet 32 which varies the length of a magnetostrictive rod 34. The rod 34 acts upon the end of the component C2 remote from end upon which the rod 24 acts. The rods 24 and 34 are actuated 180° out-of-phase whereby when the rod 24 is contracting the rod 34 is expanding and vice versa. The component C1 is maintained stationary. Pressure P is applied as described with reference to FIG. 6.

Figure 8:
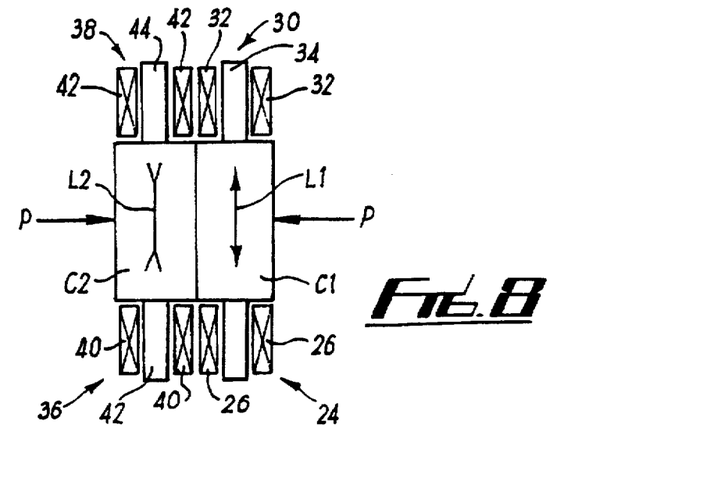
Figure 9A:
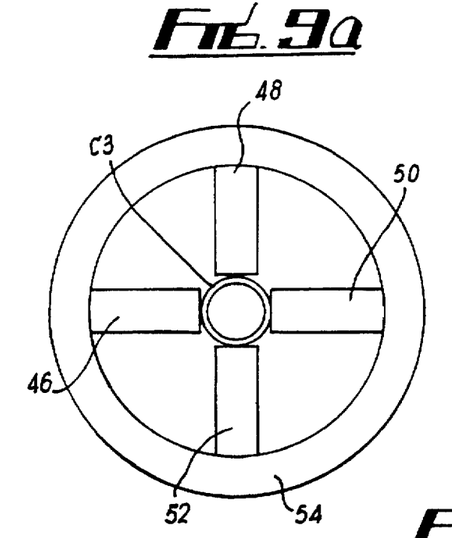
FIGS. 9a to 9e are partly diagrammatic end views of an arrangement for orbital friction welding showing various stages in operation of the arrangement.
Figure 9B:
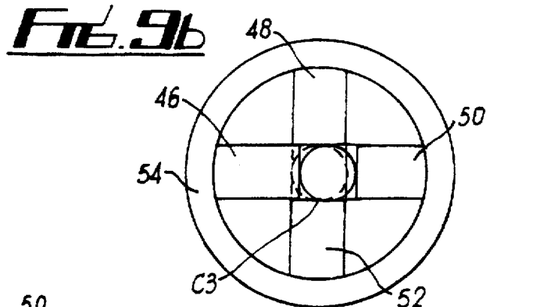
Figure 9C:
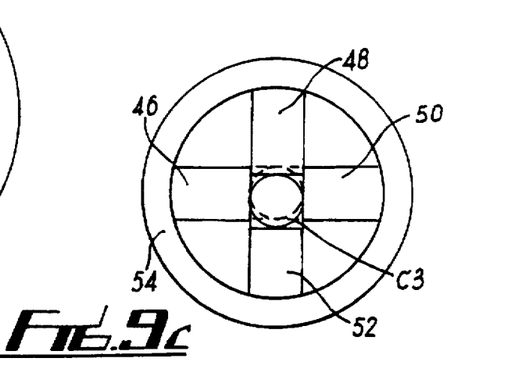
Figure 9D:
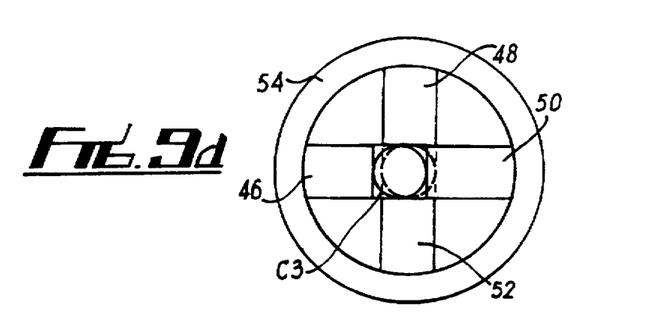
Figure 9E:
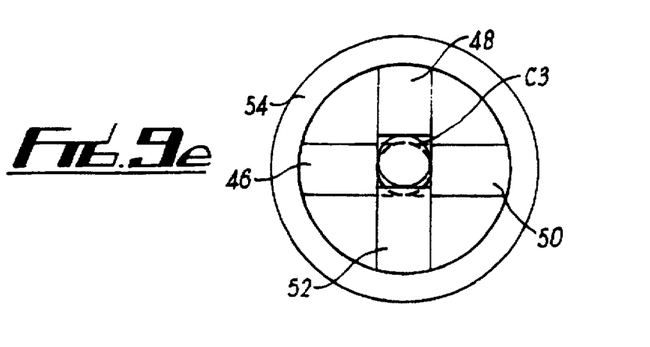

FIG. 8 shows an alternative arrangement for linear friction welding. In FIG. 8, the arrangement is similar in most respects to that shown in FIG. 7, and like items are given like reference symbols. In FIG. 8 the component C2 is also reciprocated along an axis indicated by line L2 parallel to the axis L1. The movement of the component C2 is produced by actuators 36, 38 comprising respectively an electromagnet 40 producing changes in length of a magnetostrictive rod 42 acting upon one end of the component C2, and an electromagnet 43 producing changes in length of a magnetostrictive rod 44 acting upon the other end of the component C2.

The movement of the component C2 along the axis L2 is 180° out-of-phase with that of the component C1 along the axis L1 whereby when the component C1 is moving upward as shown in FIG. 8 the component C1 is moving downward, and vice versa. Pressure P is applied as in the arrangements shown in FIGS. 6 and 7.

FIGS. 9a to 9e show various stages of an arrangement for producing orbital friction welding. In this example, a ring shaped component C3 is being joined to another component (not shown) in a plane parallel to (behind) the plane of the drawing. Magnetostrictive rods 46, 48, 50 and 52 are mounted between the outer surface of the component C3 and the inner surface of a fixed ring shaped cylinder 54. The rods 46, 48, 50, 52 have axes which all pass through a central axis of the arrangement, which as shown in FIG. 8a coincides, before energisation, with the central axis of the component C3. The axis of the rods 46, 48, 50, 52 are spaced 90° apart in a radial sense around the circumference of the component C3 in FIG. 7a to 7e. The respective inner ends of each of the rods 46, 48 50, and 52 are shown flat in FIGS. 7a to 7e. They could alternatively be concave to mate with the inner surface of the cylinder 54. The respective outer ends of the rods 46, 48, 50, 52 are convex to mate with the inner surface of the cylinder 54.

Each of the rods 46, 48, 50 and 52 is influenced by an associated electromagnet (not shown) in the manner described above with reference to FIG. 6. The phase angle of the high frequency component of the magnetic field applied from each of the four electromagnets is 90° out-of-phase with that from each of the two neighbouring electromagnets whereby each of the rods 46, 48, 50 and 52 has a 90° phase interval with respect to its neighbours in its magnetostrictive expansion-contraction cycle.

Thus, for example, if the rod 46 is at its maximum length and the rod 50 facing is at its minimum length the rods 48 and 52 are at their average or median length, as shown in FIG. 7b. Similarly, as shown in FIG. 7c, if the rod 48 is at its maximum length and the rod 52 facing it is at its minimum length the rods 46 and 50 are at their average length. The situations with the rods 50 and 52 respectively at their maximum lengths are shown in FIGS. 7d and 7e respectively.

The effect of varying the lengths of the rods 46, 48, 50 and 52 in this way is that the component C3 describes an orbital motion having both rotational and linear reciprocating components. The centre of component C3 in the plane of the drawing itself describes a circle as will be apparent from FIGS. 9b to 9e. Pressure is applied (along an axis perpendicular to the plane of the drawing) between the component C3 and the component to which it is being joined in the manner described with reference to FIG. 6.

An embodiment of the invention concerning the linear friction welding of two sheets of material will now be described with reference to FIG. 10. The material of the sheets may comprise similar or dissimilar metals, e.g. copper and/or aluminium. For example, aluminium sheet approximately 1 mm thick may be welded to copper foil approximately 0.1 mm thick or copper foils both approximately 0.1 mm thick may be welded together.

Figure 10:
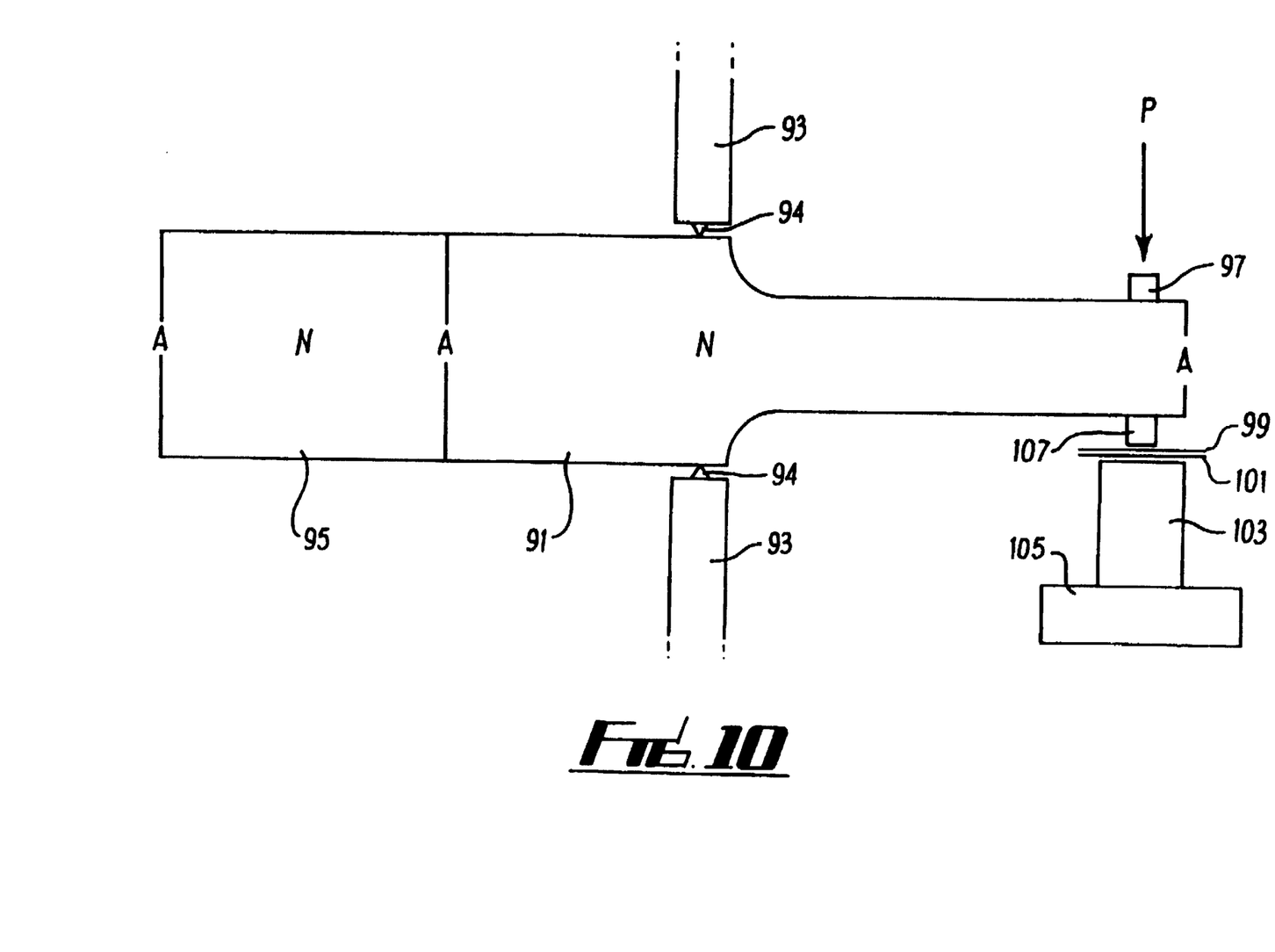
FIG. 10 is a diagrammatic side view of an arrangement for linear friction welding.

As shown in FIG. 10 a welding horn 91, e.g. made of steel or titanium, is suspended by a retaining fixture 93 in such a manner that the horn is gripped by minimum area grips 94 at a selected l6cation along its axis. A terfenol based transducer 95 is attached to the horn 91 at its broader end. Pressure is applied to the horn 91 at its other end via a pressure pad 97. The sheets to be welded together labelled 99 and 101 are placed on the upper surface of a fixed plate 103 of a jig 105 and held beneath a tip 107, e.g. made of tungsten carbide, attached to the horn 91 beneath the pressure pad 97.

In operation, ultrasonic antinodes A are arranged to be produced at the ends of the transducer 95 and a node N is arranged to be produced half-way between the two ends. Likewise, antinodes A are arranged to be produced at the ends of the horn 91 and a node N is arranged to be produced between the two at the grips 94 of the retaining fixture 93. Energisation of the transducer 95 (by an electromagnet not shown) causes linear oscillation of the adjacent horn 91 at its narrow end and this produces a linear oscillation of the tip 107 along an axis Z. The pressure applied to the pad 97 causes the tip 107 to press the sheets 99 and 101 together against the plate 103 at the same time as the tip 107 is oscillated. An oscillatory rubbing action is thereby applied between the sheets 99 and 101 to be welded together.

Successful welding of copper foil 0.1 mm thick to aluminium sheet 1.3 mm thick, and separately, of copper foil 0.1 mm to copper foil 0.1 mm, was achieved with the arrangement shown in FIG. 10 using the following conditions:

| | |
|---|---|
| working frequency | 10 kHz |
| d.c. bias applied to the transducer | 20 V at 2 A |
| a.c. power delivered to the load | 500 W |
| weld time | 5 seconds |
| weld pressure | 177 Nmm$^{-2}$ |

We claim:

1. A method of friction welding which comprises forcing together two components to be welded together and providing a relative oscillatory movement between the two components to cause rubbing together of the two components to provide friction welding thereof, said oscillatory movement being caused by means, acting on at least one of the said components, which comprises a magnetostrictive transducer wherein the magnetorestrictive transducer is coupled to the at least one component at a point remote from the welding area.

2. A method of friction welding as in claim 1 and wherein the friction welding comprises linear, arcuate or orbital friction welding.

3. A method of friction welding as in claim 1 and wherein the oscillations of the oscillatory movement have a frequency greater than 5 kHz.

4. A method as in claim 1 and wherein the magnetostrictive transducer comprises a magnetostrictive rod together with means for applying an oscillating magnetic field across the rod to cause one dimension of the rod to change in a oscillatory manner.

5. A method as in claim 4 and wherein the said magnetic field comprises an oscillatory component superimposed on a substantially constant component.

6. A method as in claim 1 and wherein the oscillatory motion provided by the said transducer is transmitted to the member to be oscillated by one or more intermediate members.

7. A method as in claim 1 and wherein there are at least two magnetostrictive transducers to provide oscillation of one of the said components.

8. A method as in claim 1 and wherein the or each transducer comprises a rod of a magnetostrictive material which incorporates terbium and iron.

9. A method as in claim 8 and wherein the magnetostrictive material comprises material having the formula $Tb_p Dy_q Fe_r$, where p is in the inclusive range 0.25 to 3.0, q is in the inclusive range 0.65 to 0.75 and r is in the inclusive range 1.8 to 2.2.

10. An apparatus for friction welding tubular members, comprising:

means for applying pressure to at least a first tubular member to force a first surface of the first tubular member against a second surface of a second tubular member, wherein the first surface is to be friction welded to the second surface;

a magnetorestrictive transducer in operative contact with the first tubular member; and means for applying an oscillating magnetic field to the magnetorestrictive transducer to cause the magnetorestrictive transducer to move in an oscillatory manner, whereby the first surface of the first tubular member is displaced in an oscillatory manner from the second surface of the second tubular member, thereby generating heat sufficient to form a weld between the first and second surfaces.

11. An apparatus as in claim 10, further comprising a first collar attached to the first tubular member and a second collar attached to the second tubular member such that the first collar is free to move relative to the second collar, the first collar having a first stepped portion opposite a second stepped portion of the second collar, wherein the magnetorestrictive transducer contacts both the first and second stepped portions.

12. An apparatus as in claim 10, further comprising a clamp attached to at least one of the first and second tubular members, the clamp having a wing in operative contact with the magnetorestrictive transducer.

13. An apparatus as in claim 12, further comprising a power transmission member contacting the wing and the magnetorestrictive member.

14. An apparatus as in claim 12, further comprising a second magnetorestrictive transducer in operative with a second wing of the clamp, the second wing being offset approximately 180 degrees from the wing.

15. An apparatus as in claim 12, wherein the clamp has a longitudinal axis that is substantially collinear with the longitudinal axis of at least one of the first and second tubular members.

16. An apparatus as in claim 10, further comprising a spring member attached to the first tubular member to oppose movement of the first tubular member induced by the magnetorestrictive transducer.

17. An apparatus as in claim 10, further comprising a second magnetorestrictive transducer offset by approximately 180 degrees from the magnetorestrictive transducer and operatively engaged with the first tubular member to oppose the movement of the magnetorestrictive transducer.

18. An apparatus as in claim 10, further comprising a frame member and first, second and third magnetorestrictive transducers, the frame member engaging the magnetorestrictive transducer and each of the first, second and third magnetorestrictive transducers and the first tubular member engaging each of the first, second, and third magnetorestrictive transducers.

19. An apparatus as in claim 18, wherein the magnetorestrictive transducer and each of the first, second and third magnetorestrictive transducers are offset from an adjacent transducer by approximately 90 degrees.

20. A method for friction welding a first tubular member to a second tubular member, comprising:

applying pressure to at least one of the first and second tubular members to force a first end of the first tubular member against a second end of the second tubular member and applying an oscillating magnetic field to a magnetorestrictive transducer engaging at least one of the first and second tubular members to cause the first and second tubular members to be displaced relative to one another in an oscillatory manner, thereby generating heat sufficient to form a weld between the first and second surfaces.

* * * * *